(12) United States Patent
Kang et al.

(10) Patent No.: US 12,551,862 B2
(45) Date of Patent: Feb. 17, 2026

(54) SORBENT FOR REMOVING RADON, PRODUCTION METHOD FOR SAME, AND RADON REMOVAL METHOD USING SAME

(71) Applicant: POSTECH RESEARCH AND BUSINESS DEVELOPMENT FOUNDATION, Pohang-si (KR)

(72) Inventors: Jae Eun Kang, Seongnam-si (KR); Woo Yong Um, Yongin-si (KR); Kumar Singh Bhupendra, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 321 days.

(21) Appl. No.: 18/025,001

(22) PCT Filed: Aug. 5, 2021

(86) PCT No.: PCT/KR2021/010349
§ 371 (c)(1),
(2) Date: Mar. 7, 2023

(87) PCT Pub. No.: WO2022/177079
PCT Pub. Date: Aug. 25, 2022

(65) Prior Publication Data
US 2023/0405549 A1 Dec. 21, 2023

(30) Foreign Application Priority Data
Feb. 22, 2021 (KR) .......... 10-2021-0023307

(51) Int. Cl.
*B01J 20/18* (2006.01)
*B01J 20/02* (2006.01)
(Continued)

(52) U.S. Cl.
CPC .......... *B01J 20/186* (2013.01); *B01J 20/027* (2013.01); *B01J 20/165* (2013.01); *B01J 20/305* (2013.01); *B01J 20/3078* (2013.01); *G21F 9/12* (2013.01)

(58) Field of Classification Search
CPC ...... B01J 20/186; B01J 20/027; B01J 20/165; B01J 20/305; B01J 20/3078; B01J 20/02;
(Continued)

(56) References Cited

U.S. PATENT DOCUMENTS 6,004,896 A * 12/1999 Addiego .............. B01D 53/944
502/79

FOREIGN PATENT DOCUMENTS

KR   20110096777   8/2011
KR   2016-0007228   1/2016
(Continued)

OTHER PUBLICATIONS

Zhen Tian, Nai-Ci Bing, Characterization of Fluorinated HB Zeolite with NH4F, Nov. 11, 2010, Advanced Materials Research, vols. 160-162, pp. 524-528 (Year: 2010).*
(Continued)

*Primary Examiner* — Daniel Berns
*Assistant Examiner* — Joshua Maxwell Speer
(74) *Attorney, Agent, or Firm* — LEX IP MEISTER, PLLC

(57) ABSTRACT

The present invention relates to a method of preparing an adsorbent for removing radon. The method includes (a) mixing a fluorine (F) compound and zeolite to produce a second mixture.

6 Claims, 2 Drawing Sheets

(51) Int. Cl.
    *B01J 20/16*     (2006.01)
    *B01J 20/30*     (2006.01)
    *G21F 9/12*     (2006.01)

(58) Field of Classification Search
    CPC ... B01J 20/18; B01J 20/30; G21F 9/12; C02F 2101/00; C02F 2103/06; C02F 1/28; C02F 1/281; C02F 2101/006
    See application file for complete search history.

(56) References Cited

FOREIGN PATENT DOCUMENTS

| | | |
|---|---|---|
| KR | 2018-0031544 | 3/2018 |
| KR | 2019-0078124 | 7/2019 |
| KR | 2020-0005323 | 1/2020 |

OTHER PUBLICATIONS

Hsien-Ming Kao and Yi-Chen Liao, Direct Solid-State NMR Observation of Tetrahedral Aluminum Fluorides in Zeolite HY Fluorinated by Ammonium Fluoride, Mar. 3, 2007, J. Phys. Chem. C, vol. 111, No. 12, 4495-4498 (Year: 2007).*

Jaeeun Kang et al., "Application of Fluorine-functionalized Zeolite to Increase Radon Removal," Abstracts of Proceedings of the Korean Radioactive Waste Society Spring 2020, Jul. 29, 2020, vol. 18, pp. 315-316.

Zhen Tian et al., "Characterization of Fluorinated HB Zeolite with $NH_4F$," Advanced Materials Research vols. 160-162 (2011) pp. 524-528, doi:10.4028/www.scientific.net/AMR.160-162.524.

Tatenuma, K et al., "Developmental study of chemical trapping method for Radon," Conference, ETDEWEB, May 1, 2000.

* cited by examiner

SORBENT FOR REMOVING RADON, PRODUCTION METHOD FOR SAME, AND RADON REMOVAL METHOD USING SAME

TECHNICAL FIELD

The present invention relates to an adsorbent for removing radon, a method of preparing the same, and a method of removing radon using the same, and more particularly, to an adsorbent containing an improved zeolite for removing radon contained in water by an adsorption method, a method of preparing such an adsorbent, and a method of removing radon using the same.

BACKGROUND ART

Recently, radioactive materials such as radon and thorium are detected throughout real life such as apartments, buildings, houses, and bed mattresses using mineral materials such as cement, aggregates, and morganite containing radioactive materials, causing social ramifications.

Although there is a difference in the amount of generation, a considerable number of underground resources contain such radioactive materials. Accordingly, researches on materials and methods that can effectively remove radioactive materials are explosively increasing due to social anxiety and a sense of crisis about health.

Radon is a radioactive element as the last element among inert gases belonging to group 18 of the 6th period on the periodic table, and is known as a heavy radioactive gas produced by the decay of radium.

Such radon is contained in small amounts in air or natural water, is present adsorbed in uranium minerals, and is dissolved in water such as mineral springs, hot springs, and groundwater. There is a report that radiation emitted from radon in its natural state does not affect the human body, but radon causes lung cancer when it is accumulated in an enclosed space such as a mine or underground.

Radon, a typical natural radionuclide, has a higher solubility than oxygen even though it is an inert gas, so it is easily dissolved in water and has a risk of leaking into the environment. Therefore, researches on the removal of radon in water are becoming important for public radiation risk assessment and mitigation.

As a method of removing radon contained in water, since radon has been considered to have no chemical components that react chemically with as an inert gas, a physical method of vaporizing radon in water using an aeration device is being currently used.

However, since radon in water vaporizes, these facilities should have separate ventilation facilities and radon in a gaseous state is discharged to the outside, thereby increasing the risk to the environment. Furthermore, there is a problem in that since the removal efficiency of radon is greatly influenced by the storage capacity of a water tank, it may be difficult to install an aeration facility having a large capacity.

Therefore, there is an urgent need for research on new technical characteristics for removing radon in groundwater by using a chemical method, getting out of the existing physical radon removal method.

(Patent Document 1) KR10-2187377B

DISCLOSURE

Technical Problem

In order to solve the above-described problems according to the related art, the present invention provides an adsorbent capable of effectively removing radon from water by an adsorption method, a method of preparing the same, and a method of removing radon using the same.

Technical Solution

In order to solve the above-described problems according to the related art, according to the present invention, an adsorbent for removing radon may include zeolite to which fluorine (F) is bound.

The zeolite may be natural zeolite.

A method of preparing an adsorbent for removing radon may include (a) mixing a fluorine (F) compound and zeolite to produce a second mixture.

The zeolite may be natural zeolite.

The fluorine (F) compound may be ammonium fluoride ($NH_4F$).

The method may further include (b) stirring the second mixture at a temperature of 60 to 100° C. for 2 to 4 hours.

The method may further include: (c) after (b), cooling the second mixture to room temperature; and (d) after (c), drying the second mixture for 12 to 24 hours.

The (a) may include: (a-1) mixing zeolite and ultrapure water to produce a first mixture; (a-2) stirring the first mixture at a temperature of 60 to 100° C. for 0.1 to 2 hours; and (a-3) after (a-2), mixing the fluorine (F) compound with the first mixture to produce the second mixture.

In (a-3), the fluorine (F) compound may be mixed with the first mixture through a plurality of times by a predetermined amount at a time to produce the second mixture.

In (a-1), 30 to 50 mL of ultrapure water per 1 g of the zeolite may be mixed.

A method of removing radon in water may include: (f) putting an adsorbent into water containing radon, wherein the adsorbent contains zeolite to which fluorine (F) is bound.

The method may further include (g) after (f), adsorbing radon by the adsorbent for 10 to 70 hours.

The water may be groundwater.

Advantageous Effects

Due to the above-described problem solving means, since radon in water is removed by a chemical adsorption method without the problems of the existing method of removing radon by physical aeration, it is possible to prepare an adsorbent including zeolite bound to fluorine at low cost, and remove radon with high removal efficiency by using the adsorbent prepared by the preparing method.

Furthermore, since radon in water is removed by a chemical adsorption method, radon in a gaseous state is not discharged to the outside during the removal of the radon, thereby minimizing environmental risks.

BEST MODE

Hereinafter, a method according to the present invention will be described in detail with reference to the accompanying drawings. Terms to be described below are defined in consideration of functions in the present invention and may be construed in different ways by the intention of users or practice. Therefore, these terms should be defined on the basis of the contents throughout the present specification.

1. Method of Preparing Adsorbent

Figure 1:
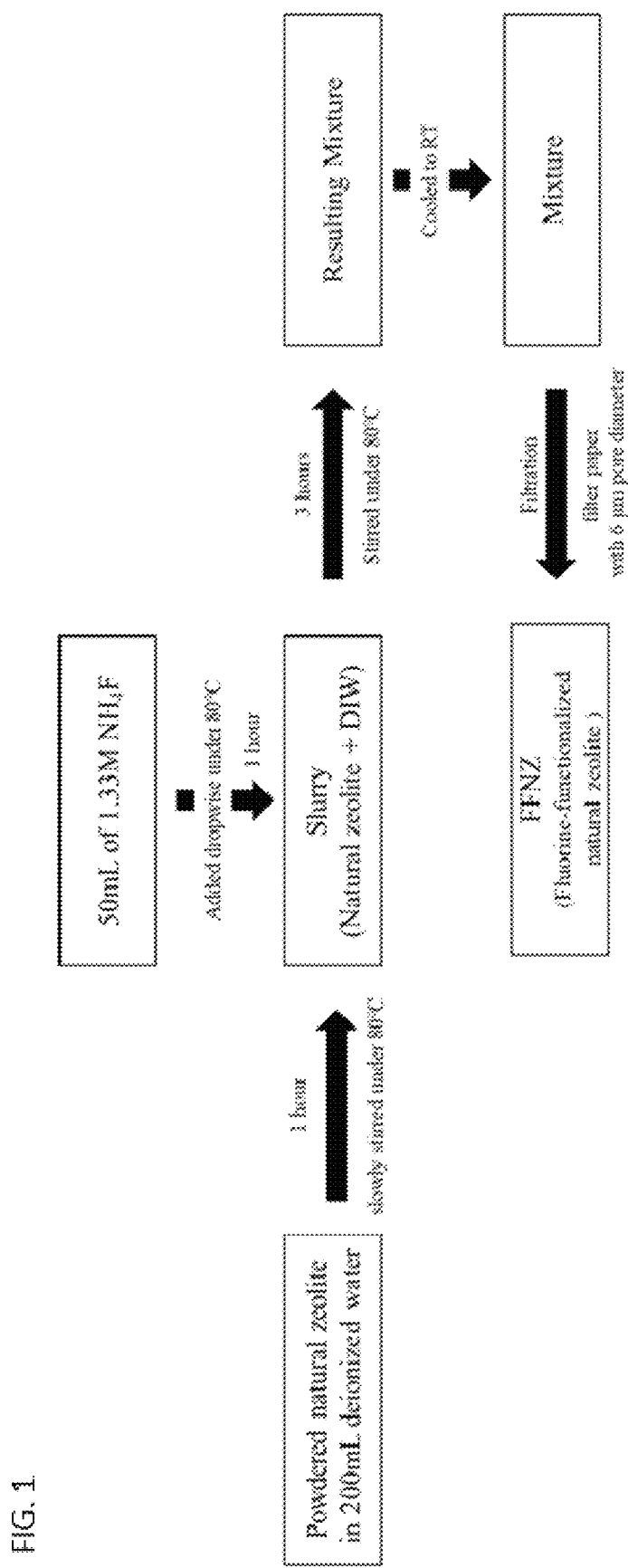
FIG. 1 is a diagram schematically illustrating a method of preparing an adsorbent for removing radon according to the present invention.

Referring to FIG. 1, a method of preparing an adsorbent for removing radon according to the present invention will be described.

The adsorbent for removing radon according to the present invention may be an adsorbent containing zeolite to which fluorine (F) is chemically bound.

A first mixture may be produced by mixing ultrapure water with zeolite in powder form for increasing a surface area. A second mixture may be produced by mixing a fluorine (F) compound with the first mixture.

Here, the zeolite may be any kind of zeolite, but may preferably be a natural zeolite. The fluorine compound may be any compound as long as it contains fluorine, but is preferably ammonium fluoride ($NH_4F$).

After the above-described second mixture is stirred at a constant temperature for a constant time, precipitate is separated from the second mixture and dried to produce the zeolite to which the fluorine is bound.

A specific preparing experiment for preparing an adsorbent for removing radon will be described.

(1) Put 5 g of powdered natural zeolite sieved to 150 μm or less to increase the surface area into a 500 mL of polypropylene bottle. The first mixture is produced by mixing 200 mL of ultrapure water with the natural zeolite.

(2) The first mixture is put in an oven and stirred at 80° C. for about 1 hour so that the zeolite is homogeneously mixed.

(3) After step (2) above, while stirring, 50 mL of 1.33M ammonium fluoride ($NH_4F$) is mixed by being slowly dropped by 1 mL each into the first mixture using a pipette for 1 hour to produce a second mixture. This is to ensure sufficient reaction by slowly mixing a small amount of ammonium fluoride.

(4) After step (3) above, the second mixture produced in step (3) above is maintained at a temperature of 80° C. for about 3 hours while stirring is maintained.

(5) Next, after stopping the stirring, the second mixture is taken out of the oven, sufficiently cooled until the temperature of the second mixture is lowered to a temperature similar to room temperature, and then dried for 12 to 24 hours.

(6) Next, precipitate is separated from the second mixture using a filter paper having a pore diameter of 6 μm.

(7) The precipitate obtained from the second mixture is sufficiently dried to finally produce zeolite chemically bound to fluorine.

2. Radon Removal Experiment

Figure 2:
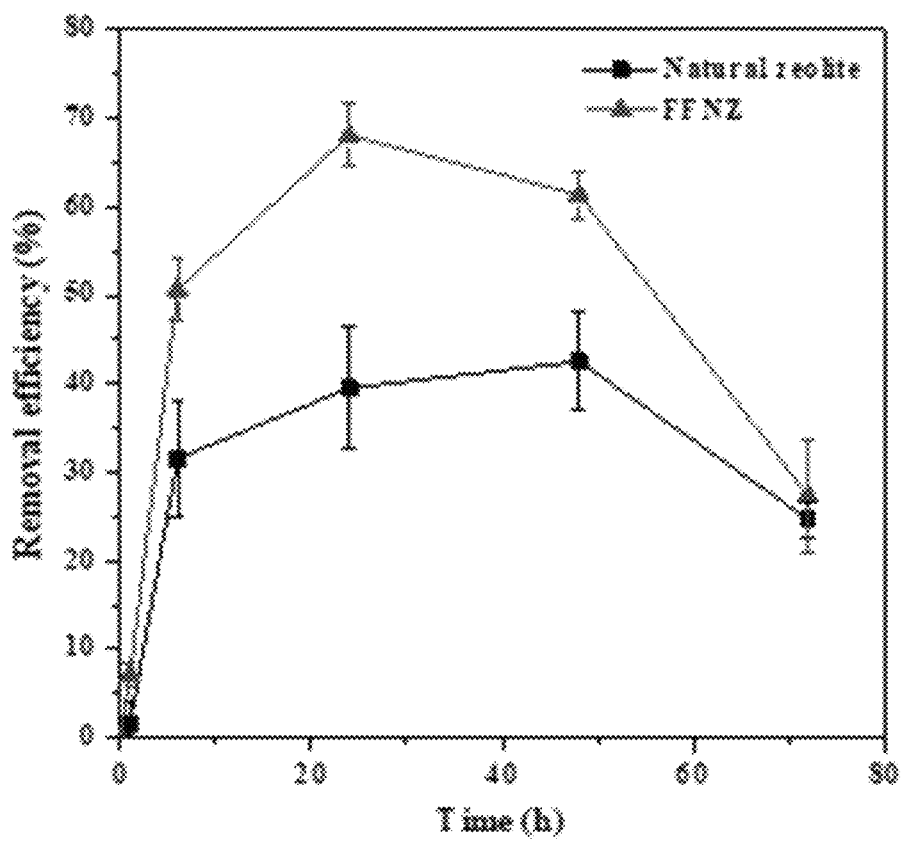
FIG. 2 is a diagram illustrating experimental results for radon removal efficiency of the adsorbent prepared by the preparing method according to the present invention and natural zeolite.

FIG. 2 is a graph comparing each radon removal efficiency in an experiment in which radon contained in groundwater is removed using simple natural zeolite and zeolite to which fluorine was chemically bound.

The experiment was conducted by putting 0.5 g each of the two adsorbents (natural zeolite and zeolite chemically bound to fluorine) into 15 mL of groundwater containing about 200 Bq/L of radon.

The radon removal efficiency was calculated using the difference between an initial radon concentration $C_0$ in groundwater and a radon concentration $C_1$ in groundwater after the adsorption experiment.

Radon removal efficiency (%)=$(C_0-C_1)/C_0*100$

Looking at the experimental results with reference to FIG. 2, after 24 hours, the radon removal efficiency of the natural zeolite is about 40%, whereas the radon removal efficiency of the zeolite chemically bound to the fluorine is 70%.

Looking at the radon removal efficiency according to the adsorption time, it can be seen that the adsorbent according to the present invention has significantly higher removal efficiency than the radon removal efficiency of the natural zeolite when the adsorption proceeds for about 10 to 70 hours. In particular, it shows remarkable radon removal efficiency for 10 to 50 hours.

In FIG. 2, FFNZ refers to the zeolite to which the fluorine is chemically bound.

Hereinabove, the present specification has been described with reference to the embodiments illustrated in the drawings so that those skilled in the art can easily understand and reproduce the present invention, but this is only exemplary, and those skilled in the art will understand that other embodiments equivalents variously modified from and equivalent to the embodiments of the present invention are possible. Therefore, the scope of protection of the present invention should be defined by the claims.

The invention claimed is:

1. A method of preparing an adsorbent for removing radon, comprising (a) mixing a fluorine (F) compound and zeolite to produce a second mixture,
    wherein the (a) includes (a-1) mixing zeolite and ultrapure water to produce a first mixture,
    wherein in (a-1), 30 to 50 mL of ultrapure water per 1 g of the zeolite is mixed,
    wherein the zeolite is natural zeolite.

2. The method of claim 1, wherein the fluorine (F) compound is ammonium fluoride ($NH_4F$).

3. The method of claim 1, further comprising (b) stirring the second mixture at a temperature of 60 to 100° C. for 2 to 4 hours.

4. The method of claim 3, further comprising:
    (c) after (b), cooling the second mixture to room temperature; and
    (d) after (c), drying the second mixture for 12 to 24 hours.

5. The method of claim 1, wherein the (a) includes:
    (a-2) stirring the first mixture at a temperature of 60 to 100° C. for 0.1 to 2 hours; and
    (a-3) after (a-2), mixing the fluorine (F) compound with the first mixture to produce the second mixture.

6. The method of claim 5, wherein in (a-3), the fluorine (F) compound is mixed with the first mixture through a plurality of times by a predetermined amount at a time to produce the second mixture.

* * * * *